United States Patent
Forest et al.

(10) Patent No.: US 7,882,424 B2
(45) Date of Patent: Feb. 1, 2011

(54) SERIAL DATA COMMUNICATION—CAN MEMORY ERROR DETECTION METHODS

(75) Inventors: Thomas M. Forest, Macomb Township, MI (US); Kerfegar K. Katrak, Fenton, MI (US); James K. Thomas, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1075 days.

(21) Appl. No.: 11/460,318

(22) Filed: Jul. 27, 2006

(65) Prior Publication Data

US 2007/0038917 A1    Feb. 15, 2007

Related U.S. Application Data

(60) Provisional application No. 60/703,651, filed on Jul. 29, 2005.

(51) Int. Cl.
*G06F 11/00* (2006.01)

(52) U.S. Cl. .................... 714/807; 714/758; 714/746; 714/798

(58) Field of Classification Search ............... 714/807, 714/758, 746, 766, 798, 799, 810
See application file for complete search history.

(56) References Cited

U.S. PATENT DOCUMENTS

| | | | | |
|---|---|---|---|---|
| 4,715,031 A | * | 12/1987 | Crawford et al. | 370/462 |
| 4,720,831 A | * | 1/1988 | Joshi et al. | 714/781 |
| 5,334,977 A | * | 8/1994 | Kato | 341/76 |
| 5,721,743 A | * | 2/1998 | Sharpe et al. | 714/758 |
| 6,718,425 B1 | * | 4/2004 | Pajakowski et al. | 710/315 |
| 7,424,553 B1 | * | 9/2008 | Borrelli et al. | 709/250 |
| 7,558,954 B2 | * | 7/2009 | Apostolopoulos et al. | 713/161 |

* cited by examiner

*Primary Examiner*—Fritz Alphonse
(74) *Attorney, Agent, or Firm*—Ingrassia Fisher & Lorenz, P.C.

(57) ABSTRACT

A method is provided for formatting a message, with a first plurality of bits forming a data component, and a second plurality of bits forming a reserved component, for transmission in a vehicle. The method comprises the steps of calculating an initial checksum from the data component, calculating a revised checksum at least from the initial checksum, and storing the revised checksum in the reserved component. The number of bits in the reserved component is less than the number of bits in the data component.

7 Claims, 7 Drawing Sheets

|  | BIT 7 (msb) | BIT 6 | BIT 5 | BIT 4 | BIT 3 | BIT 2 | BIT 1 | BIT 0 (lsb) |
|---|---|---|---|---|---|---|---|---|
| ID BYTE 1 |  |  |  |  |  | I1b2 | I1b1 | I1b0 |
| ID BYTE 0 | I0b7 | I0b6 | I0b5 | I0b4 | I0b3 | I0b2 | I0b1 | I0b0 |
|  |  |  |  |  |  |  |  |  |
| DATA BYTE 0 | X5b7 | X5b6 | X5b5 | X5b4 | X5b3 | X5b2 | X5b1 | X5b0 |
| DATA BYTE 1 | X4b7 | X4b6 | X4b5 | X4b4 | X4b3 | X4b2 | X4b1 | X4b0 |
| DATA BYTE 2 | X3b7 | X3b6 | X3b5 | X3b4 | X3b3 | X3b2 | X3b1 | X3b0 |
| DATA BYTE 3 | X2b7 | X2b6 | X2b5 | X2b4 | X2b3 | X2b2 | X2b1 | X2b0 |
| DATA BYTE 4 | X1b7 | X1b6 | X1b5 | X1b4 | X1b3 | X1b2 | X1b1 | X1b0 |
| DATA BYTE 5 | X0b7 | X0b6 | X0b5 | X0b4 | X0b3 | X0b2 | X0b1 | X0b0 |
| DATA BYTE 6 | 0 | 0 | 0 | 0 | 0 | C8b10 | C8b9 | C8b8 |
| DATA BYTE 7 | C8b7 | C8b6 | C8b5 | C8b4 | C8b3 | C8b2 | C8b1 | C8b0 |

FIG. 7

CAN FRAME DATA (8 BYTES)

FIG. 9

SERIAL DATA COMMUNICATION—CAN MEMORY ERROR DETECTION METHODS

TECHNICAL FIELD

The present invention generally relates to control systems found on automobiles and other vehicles, and more particularly relates to methods and systems for ensuring the security of data processed within a vehicle-based control system.

BACKGROUND OF THE INVENTION

Modern automobiles and other vehicles may include sophisticated on-board computer systems that monitor the status and performance of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other factors.

Various types of microcontroller or microprocessor-based controllers found on many conventional vehicles include supervisory control modules (SCMs), engine control modules (ECMs), controllers for various vehicle components (for example, anti-lock brakes, electronically-controlled transmissions, or other components), among other modules. Such controllers are typically implemented with any one of numerous types of microprocessors, microcontrollers or other control devices that appropriately receive data from one or more sensors or other sources, process the data to create suitable output signals, and provide the output signals to control actuators, dashboard indicators and/or other data responders as appropriate. The various components of a vehicle-based control system typically inter-communicate with each other and/or with sensors, actuators and the like across any one of numerous types of serial and/or parallel data links. Today, data processing components within a vehicle are commonly interlinked by a data communications network such as a Controller Area Network (CAN), an example of which is described in ISO Standard 11898-1 (2003).

Because vehicles may now process relatively large amounts of digital data during operation, it can be an engineering challenge to ensure that the data processed is accurate and reliable. As digital data is stored, processed, consumed and/or shared between or within the various data processing components of a vehicle, for example, bit errors and the like can occur due to environmental factors, hardware faults, data transmission issues and other causes. As a result, various techniques have been developed to ensure the integrity of data processed and transferred within the vehicle. However, because there may be limited space in serial data messages, there is a need for a technique utilizing less message space.

It remains desirable to formulate systems and methods for ensuring data security within vehicle control systems. Other desirable features and characteristics will become apparent from the subsequent detailed description and the appended claims, taken in conjunction with the accompanying drawings and the foregoing technical field and background.

SUMMARY OF THE INVENTION

A method is provided for formatting a message for transmission in a vehicle. In one embodiment, and by way of example only, the message comprises a first plurality of bits forming a data component and a second plurality of bits forming a reserved component, and the method comprises the steps of calculating an initial checksum from the data component, calculating a revised checksum at least from the initial checksum, and storing the revised checksum in the reserved component. The number of bits in the reserved component is less than the number of bits in the data component.

In another embodiment, and by way of example only, the message comprises a plurality of data bytes, each data byte comprises a plurality of data bits and a reserved bit, the reserved bit adjacent to a preceding data bit, and a reserved data byte, and the method comprises the steps of calculating an inverted value of the preceding data bit of each data byte, storing the inverted value of the preceding data bit of each data byte in the reserved bit of such data byte, calculating a checksum from the plurality of data bytes, and storing the checksum in the reserved data byte of the message.

An apparatus is provided for a memory for storing data for access by an application program being executed on a data processing system. In one embodiment, and by way of example only, the memory comprises a data structure stored in the memory. The data structure includes information resident in a database used by the application program. The data structure comprises a data object, an identifier object, and a checksum object. The data object comprises a plurality of data bits. The identifier object comprises a plurality of identifier bits capable of being represented by at least one integer value. The checksum object comprises a plurality of checksum bits reflecting a checksum of the plurality of data bits from the data object with the at least one integer value representing the plurality of identifier bits from the identifier object. The number of checksum bits is less than the number of data bits.

DESCRIPTION OF THE DRAWINGS

The present invention will hereinafter be described in conjunction with the following drawing figures, wherein like numerals denote like elements.

FIG. 7 depicts an exemplary data message used in the technique of FIG. 5;

FIG. 9 depicts an exemplary data message used in the technique of FIG. 8.

DESCRIPTION OF AN EXEMPLARY EMBODIMENT

Figure 1:
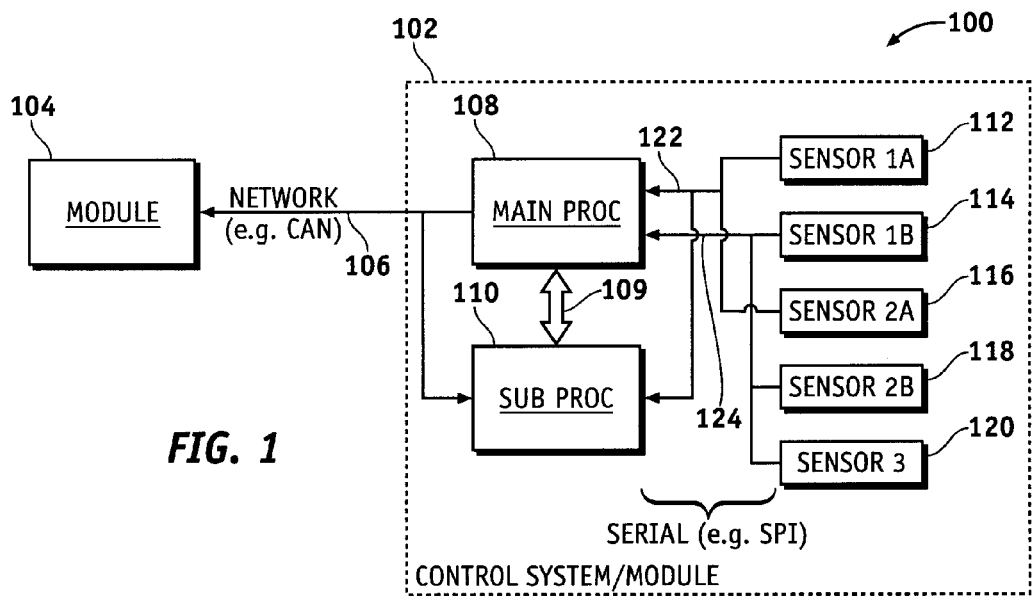
FIG. 1 depicts an embodiment of a control system for processing and/or transmitting data in an automobile.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, various methods and systems are presented for ensuring the integrity, security and/or reliability of data obtained, transmitted and/or processed by a control system. With reference to the FIG. 1, an exemplary control system 100 suitably includes any number of modules 102, 104 that exchange data via a data link 106. In various embodiments, link 106 is a Controller Area Network (CAN) or other data network connection. Modules 102, 104 may be any one of numerous types of systems or devices having any one of numerous types of data processing hardware, such as any one of numerous types of microprocessors or microcontrollers, such as a transmitter 102 and a receiver 104.

Preferably one or more modules 102 suitably include any number of redundant processors, such as a main processor 108 and a sub-processor 110, interconnected by a conventional data connection 109 as appropriate. In various embodiments, connection 109 is a UART or other internal connection (e.g., a bus connection) within transmitter 102. The processors 108 and/or 110 may be further configured to communicate with various numbers of sensors 112-120, actuators, indicators or other components as appropriate. Such connections may be provided over any type of serial, parallel, wireless or other data communication medium such as a Serial Peripheral Interface (SPI) connection or the like. In various embodiments described below, sensors 112-120 include various sensors such as primary and redundant sensors for a first variable, namely sensors 112 and 114 (respectively), primary and redundant sensors for a second variable, namely sensors 116 and 118 (respectively), and/or a sensor for a third variable, namely sensor 120. It will be appreciated that the sensors 112-120 can include, by way of example only, inertial sensors, and/or any of numerous different types of sensors. It will also be appreciated that similar concepts could be applied to various other types of sensors, actuators, indicators or other devices that are capable of transmitting or receiving data.

In various embodiments, increased reliability is provided through the use of redundant sensors and data processing. An exemplary logical configuration for transmitting data from sensors 112-120 is shown in FIG. 1. In the embodiment of FIG. 1, sensor data from the primary first variable sensor 112 and the primary second variable sensor 116 can be obtained by both the main processor 108 and the sub-processor 110 via a first serial connection 122, while sensor data from the redundant first variable sensor 114, the redundant second variable sensor 118, and the third variable sensor 120 can be obtained by the main processor 108 via a second serial connection 124. Alternatively, in another embodiment (not depicted), sensor data from the primary first variable sensor 112 and the primary second variable sensor 116 can be obtained by the main processor 108 via the first serial connection 122, while sensor data from the redundant first variable sensor 114, the redundant second variable sensor 118, and the third variable sensor 120 can be obtained by both the main processor 108 and the sub-processor 110 via the second serial connection 124. Similarly, it will be appreciated that various combinations of data values from these and/or other sources can be obtained by the main processor 108 and/or the sub-processor 110.

As shown in FIG. 1, the main processor 108 and the sub-processor 110 are interconnected via the data connection 109, and one or more of the processors (preferably at least the main processor 108) communicates with the receiver 104 via the data link 106. In practice, data from any sensor 112-120 could be provided to any processor 108, 110 or other component through a single serial link, and/or through any number of additional links.

Figure 2:
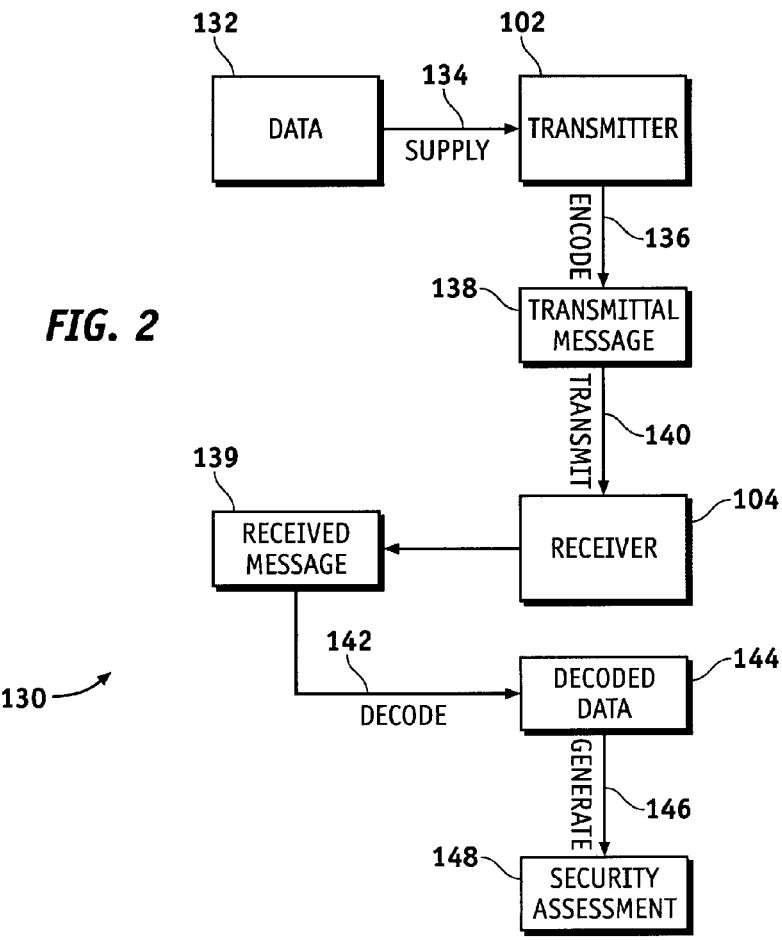
FIG. 2 depicts a method of preserving data transmitted in an automobile.
Figure 3:
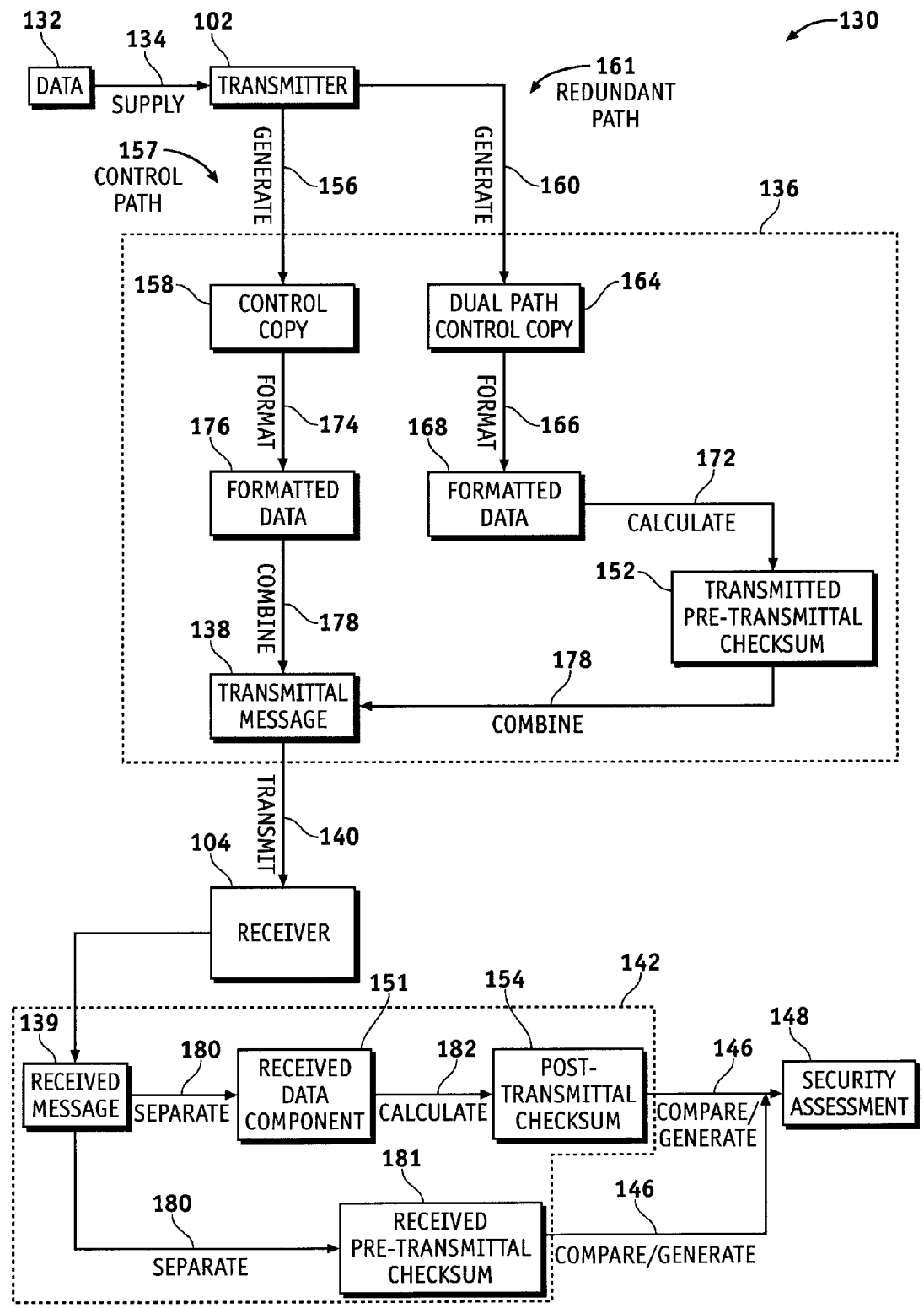
FIG. 3 provides a more detailed depiction of one embodiment of the method of FIG. 2.
Figure 4:
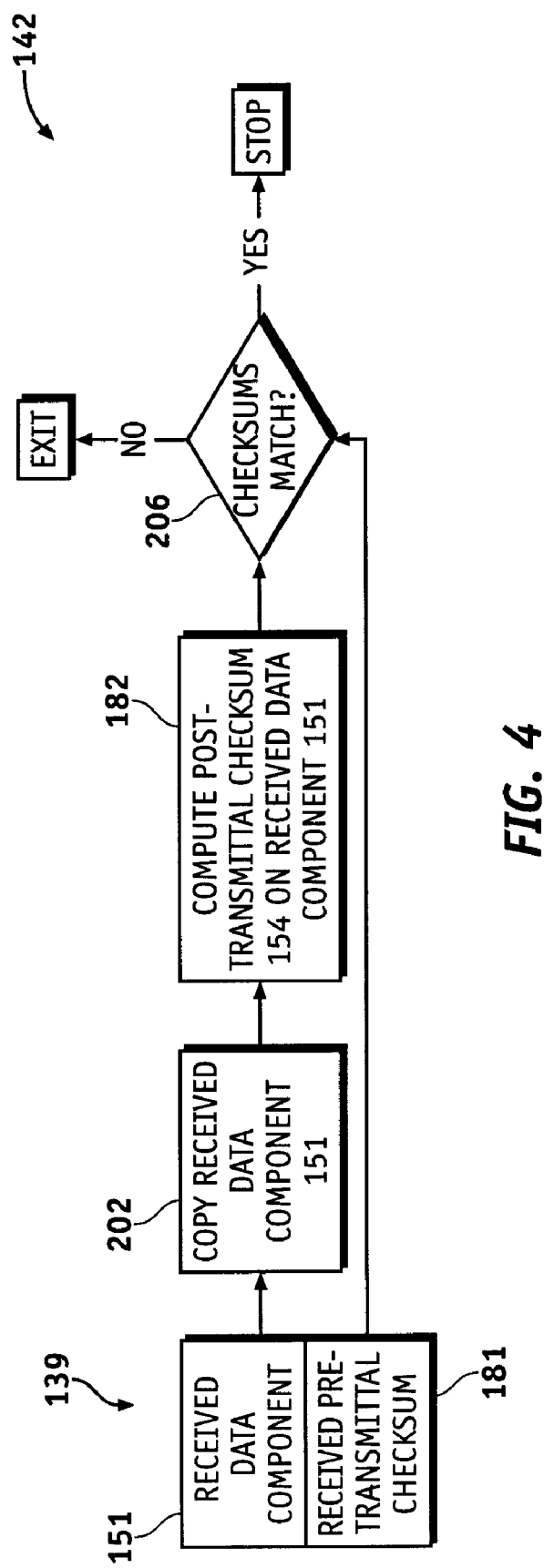
FIG. 4 depicts an embodiment of a decoding step associated with the method of FIG. 2.

The security of information may be preserved even as the data is transmitted from the transmitter 102 across link 106 to the receiver 104 using a data preserving method 130, as set forth in FIGS. 2-4. FIG. 2 provides a general overview of the data preserving method 130. First, data 132 is supplied to the transmitter 102 in step 134. It will be appreciated that the data 132 can be supplied to the transmitter 102 by means of any one of a number of different mechanisms, for example from the sensors 112-120 through the serial connections 122, 124 as set forth in FIG. 1 above, among various other potential mechanisms. Next, in step 136 the transmitter 102 encodes the data 132, generating a transmittal message 138.

Next, in step 140, the transmittal message 138 is transmitted along the link 106 to the receiver 104, where it is received in the form a received message 139. It will be appreciated that the receiver 104 can include any one of a number of different types of modules or other types of receivers. Next, in step 142 the receiver 104 decodes the received message 139, thereby generating decoded data 144. Next, in step 146, the decoded data 144 is used to generate a security assessment 148 of the information received by the receiver 104.

As will be described in greater detail below in connection with FIG. 3, the encoding step 136 relates to a technique for encoding data wherein a transmittal message 138 sent across link 106 includes a data component 150 and a transmitted pre-transmittal checksum 152 determined from a redundant path. "Checksum" in this case, and referenced throughout this application, can refer to any sort of parity, cyclic redundancy code (CRC), digest, or other technique for representing the contents of the transmittal message 138.

As will be described in greater detail below in connection with FIGS. 3 and 4, the decoding step 142 preferably includes making a copy of the received message 139, calculating a post-transmittal checksum 154 of the received data component 151 of the received message 139, and comparing the post-transmittal checksum 154 with a received pre-transmittal checksum 181.

FIG. 3 provides a more detailed depiction of various steps of the data preserving method 130. After the data 132 is supplied to the transmitter 102 in step 134, the transmitter 102 then generates, in step 156, a control copy 158 of the data 132 in a control path 157. In addition, in step 160, the transmitter generates a dual path control copy 164 of the data 132 in a redundant path 161. The dual path control copy 164 is formatted in step 166, thereby creating formatted data 168 for the redundant path 161. Then, in step 172, the formatted data 168 of the redundant path 161 is used to calculate the above-referenced transmitted pre-transmittal checksum 152. Meanwhile, in step 174, the control copy 158 of the data 132 is formatted, thereby creating formatted data 176 in the control path 157. Next, in step 178, the transmitted pre-transmittal checksum 152 from the redundant path 161 is combined with the formatted data 176 from the control path 157, thereby generating the transmittal message 138.

Next, in step 140, the transmittal message 138 is transmitted to the receiver 104, preferably via the link 106, where it takes the form of, and/or is used to create, the received message 139. Next, the receiver 104, in step 180, separates the received message 139 into a received data component 151 and the received pre-transmittal checksum 181. The post-transmittal checksum 154 is calculated from the received data component 151 in step 182, and is then, in step 146, compared with the received pre-transmittal checksum 181, and the security assessment 148 is generated. As depicted in FIG. 3, steps 156, 160, 166, 172, 174, and 178 collectively correspond with the encoding step 136 of the data preserving method 130, while steps 180 and 182 correspond with the decoding step 142, as referenced in FIG. 2. It will be appreciated that certain steps may differ in various embodiments, and/or that certain steps may occur simultaneously or in a different order.

Turning now to FIG. 4, an embodiment for the decoding step 142 of the data preserving method 130 is shown. After receiving the received message 139, with the received data component 151 and the received pre-transmittal checksum 181, the receiver 104 (not shown in FIG. 4), in step 202, generates a copy of the received data component 151. Next, in step 182, the post-transmittal checksum 154 is calculated from the copy of the received data component 151. Next, in step 206, the post-transmittal checksum 154 is compared with the received pre-transmittal checksum 181.

Turning now to FIGS. 5-9, exemplary embodiments of first and second exemplary data formatting techniques 300, 302 for encoding and formatting data with increased robustness and security are depicted, along with exemplary embodiments of data messages 304, 305 formatted, respectively, using these techniques. The first and second formatting techniques 300, 302 can be used in formatting the transmittal message 138 depicted in FIGS. 2-4, and/or any one of a number of other types of messages, for transmittal via the link 106, among various other applications.

Figure 5:
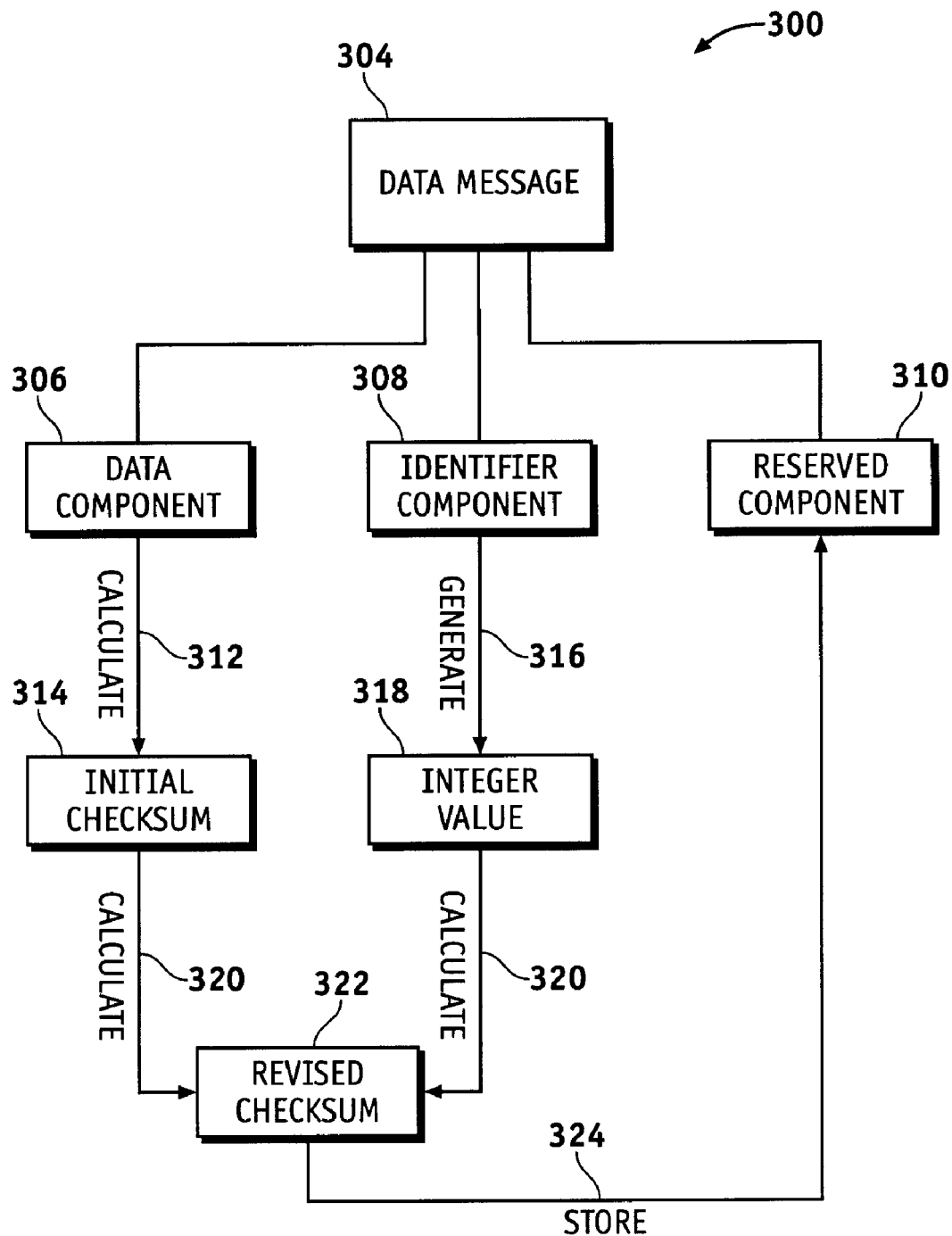
FIG. 5 depicts a technique for formatting and encoding data messages for use in an automobile.
Figure 6:
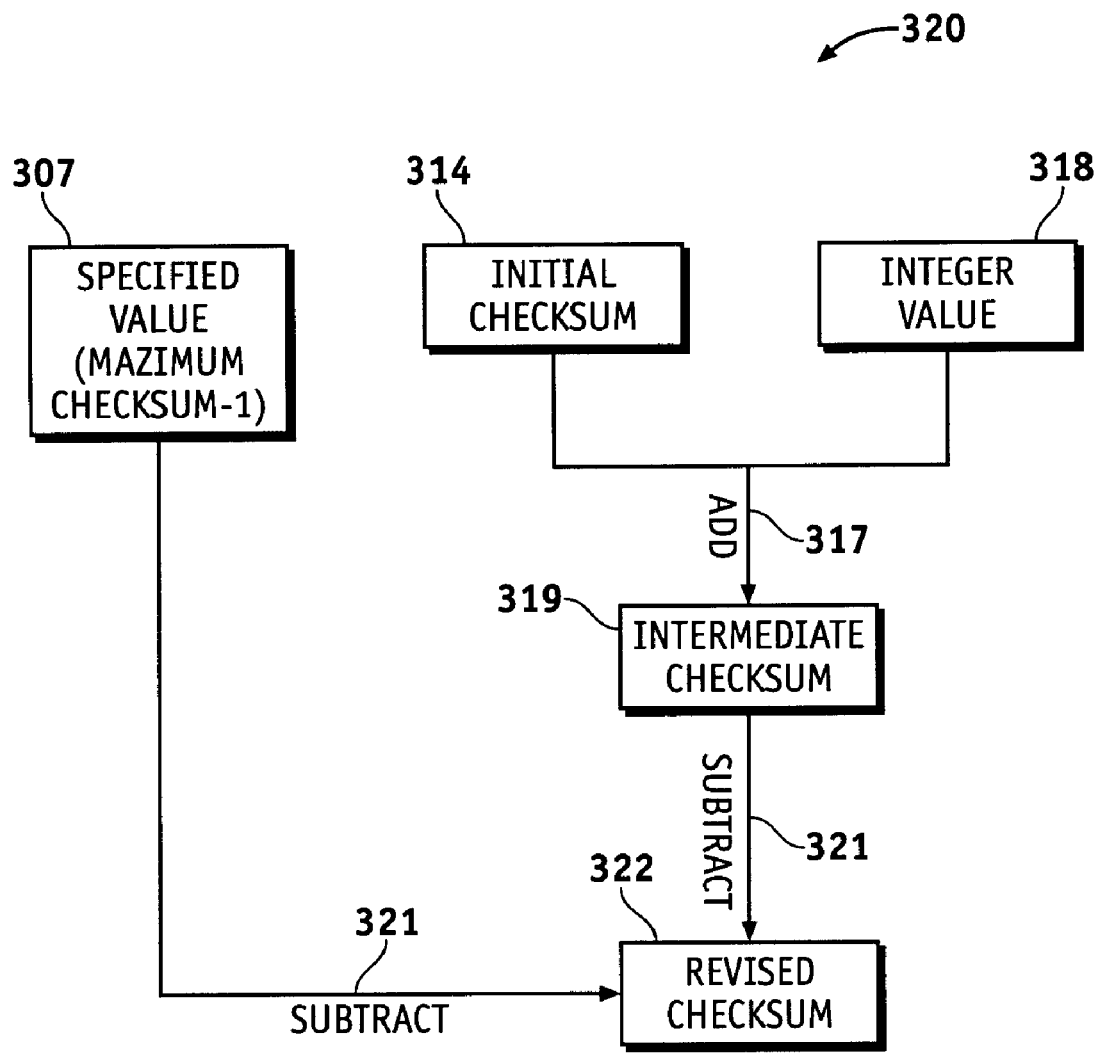
FIG. 6 depicts an exemplary embodiment of one step of the technique of FIG. 5, namely calculating a revised checksum.

FIGS. 5-7 show an exemplary embodiment of the first data formatting technique 300 (depicted in FIGS. 5-6), and an exemplary data message 304 (depicted in FIG. 7) formatted using the first technique 300. As depicted in FIG. 7, the data message 304 comprises a first plurality of bits forming a data component 306, a second plurality of bits forming an identifier component 308, and a third plurality of bits forming a reserved component 310.

As shown in FIG. 5, in step 312 of the first data formatting technique 300, an initial checksum 314 is calculated from the data component 306 of the data message 304. Preferably, the initial checksum 314 is calculated as a bytewise sum of the plurality of bits in the data component 306.

Meanwhile, preferably, in step 316, at least one integer value 318 is generated that is representative of the identifier component 308. Preferably, in step 316 the at least one integer value 318 is selected so that an increase in the value of the identifier component 308 results in an increase in the value of the at least one integer value 318. In a preferred embodiment, the potential values of the at least one integer value 318 are obtained by dividing an initial value of the identifier component 308 by a specified divider, so that when this division occurs the integer value 318 will always be a distinct and unique integer value. The information in the identifier component 308 can then be assigned to the nearest integer value 318, for example through rounding.

Next, in step 320, a revised checksum 322 is calculated from the initial checksum 314 and the at least one integer value 318. In a preferred embodiment depicted in FIG. 6, the revised checksum 322 is generated by first adding the initial checksum 314 and the at least one integer value 318 together in step 317, thereby creating an intermediate checksum 319. Then, in step 321, the intermediate checksum 319 is subtracted from a specified value 307 to generate the revised checksum 322. Preferably the specified value 307 is the maximum checksum number for the number of bits used in the checksum, minus one. For example, if an eleven bit checksum is used, then the specified value 307 is preferably 2047, or, in other words, the number two raised to the eleventh power, minus one. Under this preferred embodiment, the revised checksum 322 decreases as the initial checksum 314 increases, and also as the at least one integer value 318 increases. However, it will be appreciated that in other embodiments the revised checksum 322 can be generated differently.

Returning now to FIG. 5, next, in step 324, the revised checksum 322 is stored in the bits of the reserved component 310 of the data message 304. Preferably, the number of bits in the reserved component 310 is significantly less than the number of bits in the data component 306. Most preferably, as shown in FIG. 7, the ratio of the number of bits in the reserved component 310 to the number of bits in the data component 306 is less than or equal to 3:16. The relatively small size of the reserved component 310 allows the first data formatting technique 300 to protect against data errors, while minimizing the amount of memory and the number of messages used in the process, thereby reducing the risk of collisions on the link 106.

While FIG. 7 shows a particular data message 304 with ten bytes, with each byte containing eight bits, it will be appreciated that the first data formatting technique 300 can be used in connection with data messages 304 having any one of a number of different sizes and configurations. It will similarly be appreciated that the absolute and/or relative sizes and/or configurations of the respective components of the data message 304 can differ from that depicted in FIG. 7. It will also be appreciated that certain steps of the first data formatting technique 300, for example steps 312 and 316, can either be conducted simultaneously or in any other order, and/or that in certain embodiments the use of the at least one integer value may not be necessary. It will also be appreciated that certain embodiments of the first data formatting technique 300 can differ from the specific embodiment depicted in FIGS. 5-6. For example, step 316 may be omitted in certain circumstances in which the identifier component 308 does not need to be tested—in such circumstances, the intermediate checksum 319 can be identical to the initial checksum 314.

Figure 8:
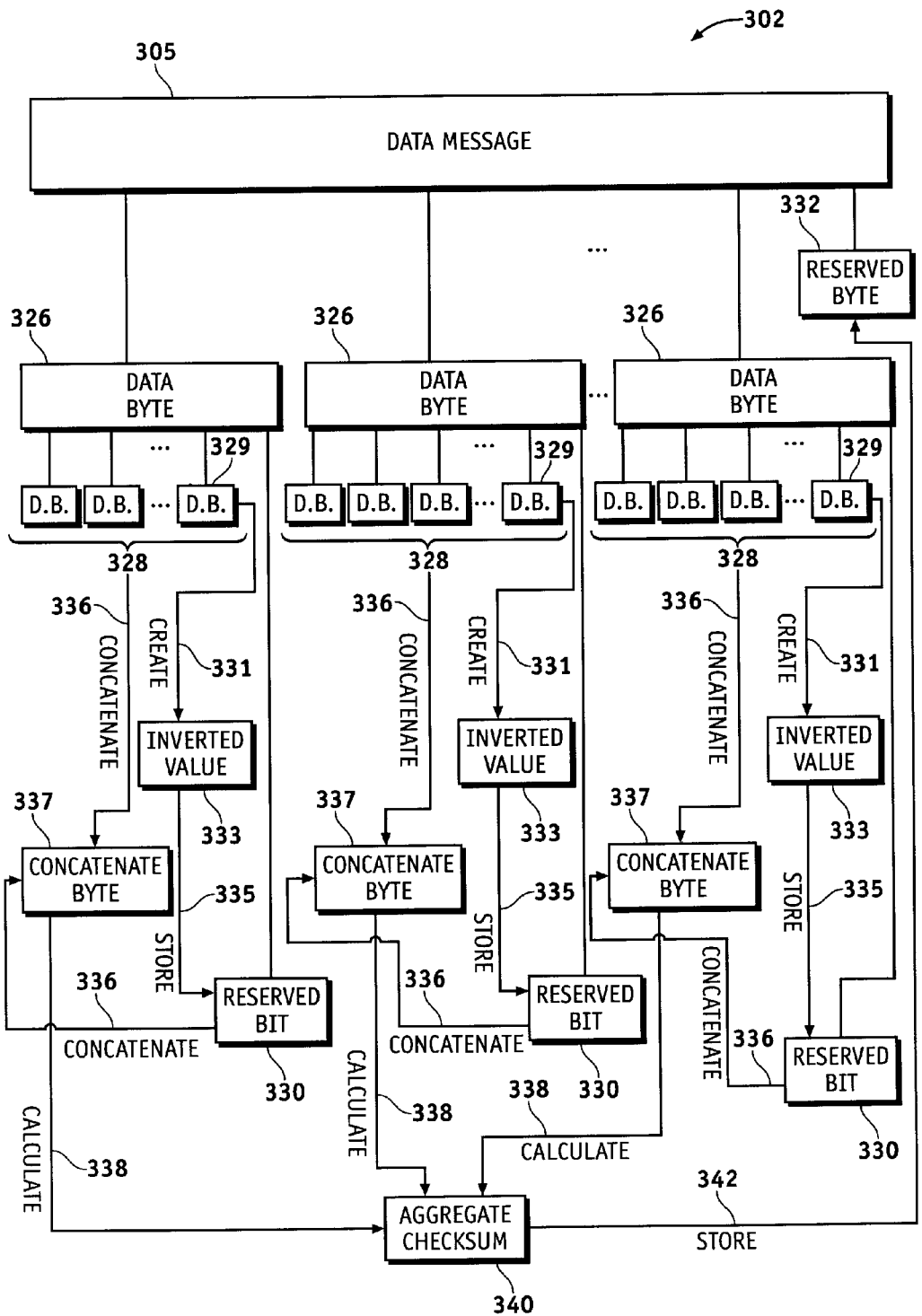
FIG. 8 depicts an alternate technique for formatting and encoding data messages for use in an automobile.

FIGS. 8-9 show an exemplary embodiment of the second data formatting technique 302 (depicted in FIG. 8), and an exemplary data message 305 (depicted in FIG. 9) formatted using the second technique 302. As depicted in FIG. 9, the data message 305 comprises a plurality of data bytes 326, with each data byte 326 comprising a plurality of data bits 328 and a reserved bit 330, and a reserved byte 332. Also as shown in FIGS. 8-9, the reserved bit 330 for each data byte 326 preferably appears at the end of the data byte 326, with the data bit 328 immediately preceding the reserved bit 330 denoted as the preceding data bit 329.

As shown in FIG. 8, in step 331 of the second data formatting technique 302, an inverted value 333 is calculated from the preceding data bit 329 for each data byte 326, by inverting the numeric value of the preceding bit 329. Next, in step 335, the inverted value 333 for each data byte 326 is stored in the reserved bit 330 of such data byte 326.

Meanwhile, in step 336, the data bits 328, and preferably also the reserved bits 330, are concatenated to form a concatenated byte 337 for each data byte 326, for use in calculating an aggregate checksum 340. Next, in step 338, the concatenated bytes 337 for each of the data bytes 326 are used to calculate the aggregate checksum 340 for the data message 305, preferably by taking an exclusive or checksum of the concatenated bytes 337. However, it will be appreciated that the aggregate checksum 340 can be calculated in any one of a number of different manners. Next, in step 342, the aggregate checksum 340 is stored in the bits of the reserved byte 332 of the data message 305.

While FIG. 9 shows a particular data message 305 with eight bytes, and each byte containing eight bits, it will be appreciated that the second data formatting technique 302 can be used in connection with data messages 305 having any one of a number of different sizes and configurations. It will similarly be appreciated that the absolute and/or relative sizes and/or configurations of the respective components of the data message 305 can differ from that depicted in FIG. 9. It will also be appreciated that certain steps of the second data formatting technique 302 can either be conducted simultaneously or in a different order. It will also be appreciated that certain embodiments of the second data formatting technique 302 can differ from the specific embodiment depicted in FIG. 8. For example, similar steps can also be conducted for any identifier data bytes in the data message 305, and individual checksums can be calculated for any such identifier data bytes, and/or added to or otherwise used in conjunction with the aggregate checksum 340.

It is noted that both the first and second techniques 300, 302 for formatting data can be very useful tools in controlling data errors. In particular, the first technique 300 is especially useful for detecting errors that force bits (whether or not they are consecutive) in a single direction, whereas the second technique 302 is especially useful for detecting errors that force consecutive bits in one direction. It will also be appreciated that the first and second techniques 300, 302, and/or certain component steps thereof, can also be used in conjunction with one another in certain embodiments.

It will also be appreciated that the first and second data formatting techniques 300 and 302 can be used in connection with other features and steps described elsewhere in this application, and/or in connection with any other methods or uses of transmitting data messages in vehicles. It will similarly be appreciated that the that the other elements and steps described elsewhere in this application can be used in connection with the first and second data formatting techniques 300, 302, and/or in connection with any other techniques for data formatting.

Using the techniques described above, data security and integrity can be increased within an automotive or other data processing system through the use of redundancy and other dual-path techniques. As noted above, the particular techniques described herein may be modified in a wide array of practical embodiments, and/or may be deployed in any type of data collection, control, or other processing environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A memory for storing data for access by an application program being executed on a data processing system, comprising:
   a data structure stored in the memory, the data structure including information resident in a database used by the application program and including:
   a data object comprising a plurality of data bits;
   an identifier object comprising a plurality of identifier bits represented by at least one integer value; and
   a checksum object comprising a plurality of checksum bits reflecting a checksum of the plurality of data bits from the data object with the at least one integer value representing the plurality of identifier bits from the identifier object, and wherein the number of checksum bits is less than the number of data bits.

2. The memory of claim 1, wherein the at least one integer value is generated by dividing an initial value of the identifier component by a specified divider, such that when this division occurs the integer value will always be a distinct and unique integer value, and such that an increase in the value of the identifier component results in an increase in the value of the at least one integer value.

3. The memory of claim 1, wherein the plurality of checksum bits in the checksum object reflect at least a checksum comprising a bytewise sum of the plurality of data bytes.

4. The method of claim 1, wherein the revised checksum is inversely related to the initial checksum and the at least one integer value.

5. The memory of claim 4, wherein the plurality of checksum bits in the checksum object reflect the subtraction of the checksum and the at least one integer value from a specified value.

6. The memory of claim 5, wherein:
   the checksum includes a specific number of bits; and
   the specified value is the maximum checksum number for the specific number of bits.

7. The memory of claim 6, wherein the ratio of the number of checksum bits to the number of data bits is less than or equal to 1:2.

* * * * *